M. N. YOKICH.
APPARATUS FOR MAINTAINING PIPES STRAIGHT.
APPLICATION FILED OCT. 29, 1918.
1,316,822.
Patented Sept. 23, 1919.
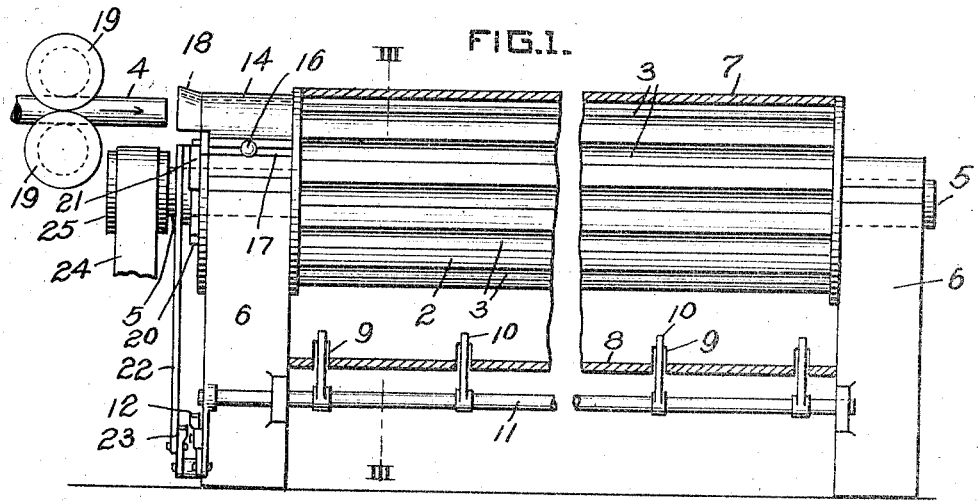
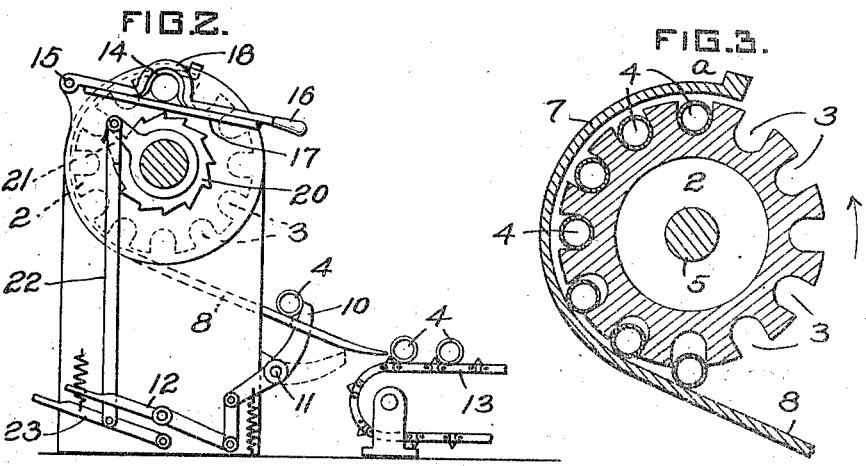
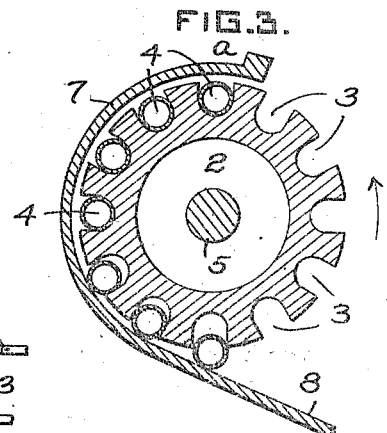
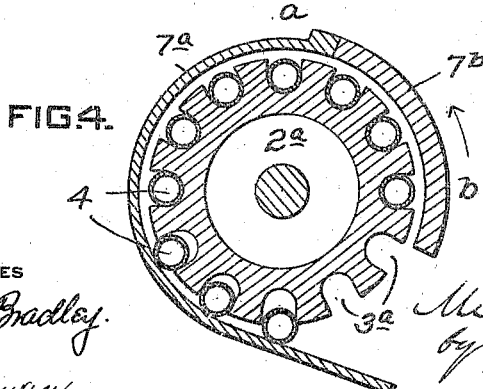
WITNESSES
INVENTOR
Milivoy N. Yokich

UNITED STATES PATENT OFFICE.

MILLIVOY N. YOKICH, OF WOODLAWN, PENNSYLVANIA.

APPARATUS FOR MAINTAINING PIPES STRAIGHT.

1,316,822.  Specification of Letters Patent.  Patented Sept. 23, 1919.

Application filed October 29, 1918. Serial No. 260,095.

*To all whom it may concern:*

Be it known that I, MILLIVOY N. YOKICH, a subject of the King of Servia, residing at Woodlawn, in the county of Allegheny and State of Pennsylvania, have invented certain new and useful Improvements in Apparatus for Maintaining Pipes Straight, of which the following is a specification.

My invention relates to an improvement in the art of manufacturing metal pipe and has in view to provide means for maintaining the pipe straight after manufacture. Ordinarily pipe manufactured either by rolling, drawing, swaging or any other of the usual commonly employed methods is very apt to be more or less bent or distorted after being formed, between the formative period and until the pipe is cool, due to the usual high degree of welding or manufacturing heat employed.

Various forms of straightening mechanism have been utilized to bring the pipe to straight formation, and at present such machines are ordinarily used, because of the common tendency to distortion referred to. In my invention, I provide means for receiving the individual pipes as made in pockets of a size adapted to admit the pipe and to maintain it in substantially straight formation during the cooling operation, and to deliver the pipes after sufficient cooling to suitable conveying apparatus.

In the drawing, illustrating one preferred embodiment of the invention.

Figure 1 is a view of the apparatus in front elevation, partly in section and partly broken away;

Fig. 2 is an end view of the machine beyond the brake pulley, showing the main shaft in section;

Fig. 3 is a cross sectional view enlarged on the line III—III of Fig. 1;

Fig. 4 is a similar sectional view showing a modified construction.

In the machine I provide a generally cylindrical carrier drum 2 of sufficient length to receive the lengths of pipe sections in a series of peripherally arranged pockets 3 of a size to just snugly receive and embrace the pipe sections 4, as indicated in Fig. 3.

Drum 2 is mounted by suitable journals 5 in pillow blocks or housings 6, 6, at each end, and is provided with a partially surrounding retaining shield or coping 7. Said shield extends from the initial charge position $a$ around the rear side of the drum in the direction of its rotation, and terminates at the bottom in an inclined delivery apron or terminal 8. Terminal 8 is provided at intervals with clearance slots 9 through which project a series of arms 10 mounted on an actuating shaft 11 and provided with an operating treadle 12 or other suitable mechanism, whereby to lower the arms 10 from time to time to deliver the pipe sections 4 by gravity to a suitable conveyer 13, as will be readily understood.

At one end the apparatus is provided with a guide 14 preferably hinged at 15 and having a handle 16 so that it may be located in operative position over a bridge plate 17 extending across the upper portion of the housing or bearing 6 at the receiving end of the machine. The outer portion of guide 14 is preferably flared as at 18, whereby to receive the pipe section 4 in its passage from reducing or feeding rolls 19, 19, of the forming machine. Said rolls are merely illustrative and typical of any suitable pipe making machine or apparatus, and it will be understood that the pipe sections 4 may be propelled into the receiving pockets 3, one at a time, by any suitable means which will insure the thrusting of the pipe clear into each pocket between the terminal housings.

Drum 2 is intermittently actuated one space, as each pipe is charged into an additional pocket by any suitable means, as a ratchet wheel 20 and tooth 21 actuated by pitman 22 connected with treadle 23. A brake band 24 may, if necessary, be utilized in connection with a pulley 25 on journal 5, whereby to prevent unnecessary rotation of the drum, due to its unbalancing by the series of pipes at one side. If desired, the drum may be changed in different respects or details by the skilled mechanic to suit its application to varying diameters and lengths of pipe, or to meet other conditions.

In Fig. 4, I show a modified construction of the apparatus in which the drum $2^a$ is generally the same as above described, having the series of peripheral longitudinally arranged pockets $3^a$ with the rear inclosing housing $7^a$. In the present case, however, I have provided a supplemental housing or retaining wall $7^b$ extending for any desired distance beyond the terminal of the main closure, and from the inserting position $a$ at the top to an inserting position $b$, say about midway of the height of the drum. The supplemental covering $7^b$ is preferably reinforced by being made thicker, as shown, and it provides for a longer retention of the pipes in the drum.

Thus, in the case of extra large size or extra heavy pipes, the heat will be retained for a considerably longer period of time, and will be higher at the time of charging the pipes into the drum than in ordinary or small size pipes. In such case, a prolongation of the cooling period within the drum pockets insures the desired maintenance of straightness in the pipes by the additional time provided for by the additional closing wall. In such case, of course, the guide 14 is located at a point corresponding to the position of the receiving socket 3ª at the half depth or other position with relation to the drum.

The construction and operation will be generally understood from the foregoing description. As each pipe is charged into its pocket 3, hot, the rotation of drum 2 will carry it successively around inside of shield 7, during which progress, the pipe will have sufficient opportunity to cool and rigidly set, preventing any bending or other distortion, and each pipe will be delivered automatically by gravity upon arrival at the bottom. One or more pipes are lowered from time to time onto conveyer 13 by levers 10, and the operation is practically continuous as long as the pipes are manufactured.

What I claim is:

1. A maintaining apparatus for pipes consisting of a rotatable cylindrical receiver having an annular series of parallel continuous supporting and confining channels adapted to receive hot pipes and to retain them therein until cooled.

2. A maintaining apparatus for pipes consisting of a rotatable cylindrical receiver having an annular series of continuous supporting and confining channels adapted to receive hot pipes and to retain them therein until cooled, and a partly surrounding retaining shell adapted to permit discharge of the cooled pipes from said channels by gravity.

3. A pipe maintaining apparatus consisting of a rotatable drum having a peripheral series of continuous longitudinal receiving and supporting grooves and a partly surrounding retaining shell.

4. A pipe maintaining apparatus consisting of a rotatable drum having a peripheral series of continuous longitudinal receiving and supporting grooves and a partly surrounding retaining shell having an inclined delivery terminal.

5. A pipe maintaining apparatus consisting of a rotatable drum having a peripheral series of continuous longitudinal receiving and supporting grooves, a partly surrounding retaining shell having an inclined delivery terminal, and means for transmitting cooled pipes therefrom to a conveyer.

6. In combination, a receiving drum provided with an annular series of longitudinal grooves providing continuous embracing supporting channels for the pipe, means for intermittently rotating the drum to bring each groove into register with the line of feed, and a guiding device leading to each groove when said groove is in register therewith.

7. In combination, a receiving drum having an annular series of continuous concave bottom receiving grooves, means for intermittently rotating the drum to bring each groove into register with the line of feed, means for preventing undue movement of the drum, a retaining shield around the drum, and a guide for leading each pipe into registering engagement with each groove as the drum is rotated.

8. In combination with a drum having an annular series of continuous longitudinal receiving and holding grooves, and means for intermittently rotating the drum and for guiding a pipe into each groove; a partly surrounding retaining shield having an inclined delivery terminal provided with clearance slots, and a series of pivoted retaining arms extending therethrough adapted to first engage and then to lower the pipes by gravitation successively across the terminal of the shield.

9. In combination with a drum having an annular series of continuous longitudinal receiving and holding grooves, and means for intermittently rotating the drum and for guiding a pipe into each groove; a partly surrounding retaining shield having an inclined delivery terminal provided with clearance slots, a series of pivoted retaining arms extending therethrough adapted to first engage and then to lower the pipes by gravitation successively across the terminal of the shield, and a conveyer adapted to receive the pipe therefrom.

In testimony whereof I hereunto affix my signature.

MILLIVOY N. YOKICH.